United States Patent [19]

Brockway et al.

[11] Patent Number: 4,729,973
[45] Date of Patent: Mar. 8, 1988

[54] PROCESS FOR PRODUCING CERAMIC COMPOSITES FROM MICROCOMPOSITE PARTICLES HAVING DISPERSED FIBROUS MICROSTRUCTURES AND THE PRODUCT THEREOF

[75] Inventors: Marion Brockway, Columbus; Beebhas Mutsuddy, Lancaster; Roger Wills, Solon, all of Ohio

[73] Assignee: Battelle Memorial Institute, Columbus, Ohio

[21] Appl. No.: 35,568

[22] Filed: Apr. 7, 1987

[51] Int. Cl.$^4$ .................. C04B 35/060; C04B 35/062; C04B 35/064
[52] U.S. Cl. ...................................... 501/95; 501/152; 501/153; 501/154; 264/6; 264/8; 264/60
[58] Field of Search ................. 501/95, 152, 153, 154; 264/5, 6, 8, 60

[56] References Cited

U.S. PATENT DOCUMENTS

| | | | |
|---|---|---|---|
| 4,103,063 | 7/1978 | Hulse | 501/95 |
| 4,543,345 | 9/1985 | Wei | 501/95 |
| 4,595,663 | 6/1986 | Krohn et al. | 501/153 |

Primary Examiner—William R. Dixon, Jr.
Assistant Examiner—David M. Brunsman
Attorney, Agent, or Firm—Klaus H. Wiesman

[57] ABSTRACT

A process for producing toughened ceramic composites from ceramic precursor materials by forming microcomposite particles from the ceramic precursor materials to produce microstructures that impart enhanced toughness to the particles. The microcomposite particles are consolidated at a pressure, a temperature and for a time sufficient to form bulk ceramic components that exhibit the general microstructure and toughness of the microcomposite particles while the temperature is maintained above that where particle consolidation occurs but below the eutectic or melting temperature of the matrix. The consolidated product retains the toughness of the microcomposite particles.

16 Claims, 9 Drawing Figures

50X

200μm

2500X

4μm 500X  
20μm 2000X  
5μm

250X  $K_{IC} \approx 5.5$ MNm$^{-3/2}$  40μm

250X  $K_{IC} \approx 8.0$ MNm$^{-3/2}$  40μm

1500X

7 μm

PROCESS FOR PRODUCING CERAMIC COMPOSITES FROM MICROCOMPOSITE PARTICLES HAVING DISPERSED FIBROUS MICROSTRUCTURES AND THE PRODUCT THEREOF

STATEMENT OF GOVERNMENT INTEREST

This invention was made partially with the Government support under Contract No. AFOSR-84-0353 awarded by the Department of the Air Force. The Government has certain rights in this invention.

FIELD OF THE INVENTION

The present invention relates to the forming of composite articles which exhibit high fracture toughness by virtue of fiber, whisker or elongated microstructural elements.

BACKGROUND OF THE INVENTION

Traditionally ceramic products have been utilized where their hardness, wear resistance, heat resistance, or corrosion resistance was essential. Applications as mechanical components have been limited because of the low fracture toughness and strength inadequacies of ceramics.

Much research has been directed to means for significantly increasing the fracture toughness of ceramics and thereby enabling their use as high temperature structural components in heat engines, bearings, cutting tools, etc.

Major research efforts have been directed to producing "tough" ceramics via transformation toughening, especially through the use of incorporated metastable tetragonal zirconia constituents. Large improvements in low temperature toughness have been achieved which have expanded the mechanical or structural utility of ceramic components of zirconia or tetragonal zirconia containing ceramics. However, this type of toughening is degraded at elevated temperatures important to heat engines or other applications. Examples of transformation toughening include the following U.S. Pat. Nos. 4,218,253 to Dworak et al; 4,520,114 to David; 4,532,224 to Hori; and 4,587,224 to Keefer et al.

A second toughening approach is to form ceramic/ceramic composites in which at least one constituent is fibrous (elongated). Many research studies have explored techniques for incorporating continuous fibers, discontinuous fibers, or whiskers into ceramic matrices. The largest increases in toughening have been achieved by incorporation of uniaxially aligned continuous fibers. But, promising results have also been demonstrated by dispersing ceramic whiskers in ceramic matrices. For example, see U.S. Pat. No. 4,543,345. Much larger increases in toughness levels are desired and are being pursued in continuing extensive research activity. A highly desired advantage of the fiber composite versus transformation toughening is the potential to retain toughness at high application temperatures.

While ceramic/ceramic fiber-containing composites offer great potential, there are inherent practical difficulties in their fabrication, especially on a commercial scale. The three major problems are: (1) damage to the fibers during incorporation into the matrix and its densification, (2) controlling the fiber orientation within the matrix, and (3) "uniformly" distributing the fibers within the matrix.

FIG. 1 outlines the present state-of-the-art approaches to forming ceramic/ceramic composites incorporating discontinuous fibers or whiskers. This figure is self-explanatory and problems associated with the forming approaches are given. However, some of the problems should be highlighted which the invention seeks to avoid or minimize. For both Processes 1 and 2 the consolidation of a low density combination of fibers and matrix and the further densification by sintering or hot pressing virtually assure damage and degradation of the fiber phase and the creation of localized micro/macroscopic density or inhomogeneity defects. For Process 3, mechanical damage of the fibers is circumvented, but inhomogeneities of the starting fiber array are virtually impossible to avoid on a micro-macroscopic scale. Furthermore, uniform infiltration throughout the fiber preform is essentially impossible and is a very slow and costly process unless the composite has at least one very small dimension in cross-section. The noted types of defects can degrade both strength and toughness of the composite ceramic.

BRIEF DESCRIPTION OF THE INVENTION

An objective of the invention is to produce small microcomposite particles having fibrous or elongated structures such as dendrites or whiskers or fibers in their microstructure which confer mechanical toughness. These particulate microcomposites are then consolidated by hot pressing to form useful ceramic parts or components which possess the same basic microstructure and associated toughness.

The invention departs from the prior art of forming fiber containing ceramic/ceramic composite parts in that it is centered on processes for forming small microcomposites. In contrast, prior art (see FIG. 1) employs processes for either combining large masses of fibers with matrix or in infiltrating large (parts or component size) fiber preforms with matrix. With the present invention it is possible to use processes to achieve desired microstructures in small particulate microcomposites which are not usable for processing large masses of fibers and matrix or infiltrating large fiber preforms. By employing processes applicable to microcomposite particle formation followed by hot consolidation it is possible to avoid or reduce problems of mechanical fiber degradation or macro fiber distribution or density inhomogeneities. All microparticles, fibers, whiskers used or produced in the present invention are ceramic.

Three embodiments of a process are presented for forming the microcomposite particles that are hot consolidated into ceramic parts. The first embodiment is the formation of rapidly solidified particles of miscible ceramic compositions which yield elongated or fiber-like phases (dendrites) in their solidified microstructures. The second embodiment is rapid solidification of mixtures of immiscible molten ceramics so as to form particles containing one or more elongated dispersed phases. The third embodiment forms small microcomposite (agglomerates of matrix powder and fibers) which are densified sufficiently to confer integrity during subsequent processing.

DETAILED DESCRIPTION OF THE INVENTION AND PREFERRED EMBODIMENTS

A first embodiment of the invention uses rapid solidification technology to form microcomposite particles having at least one fibrous or elongated phase dispersed within a matrix phase or phases. The terms fiber or fibrous as generally used herein includes the usual meaning of the words as well as whiskers which are amaller fibers and dendritic structures which are fiber-like in morphology. Where the terms cannot be used in a general sense the specific term dendrite or whisker has been used.

Figure 1:
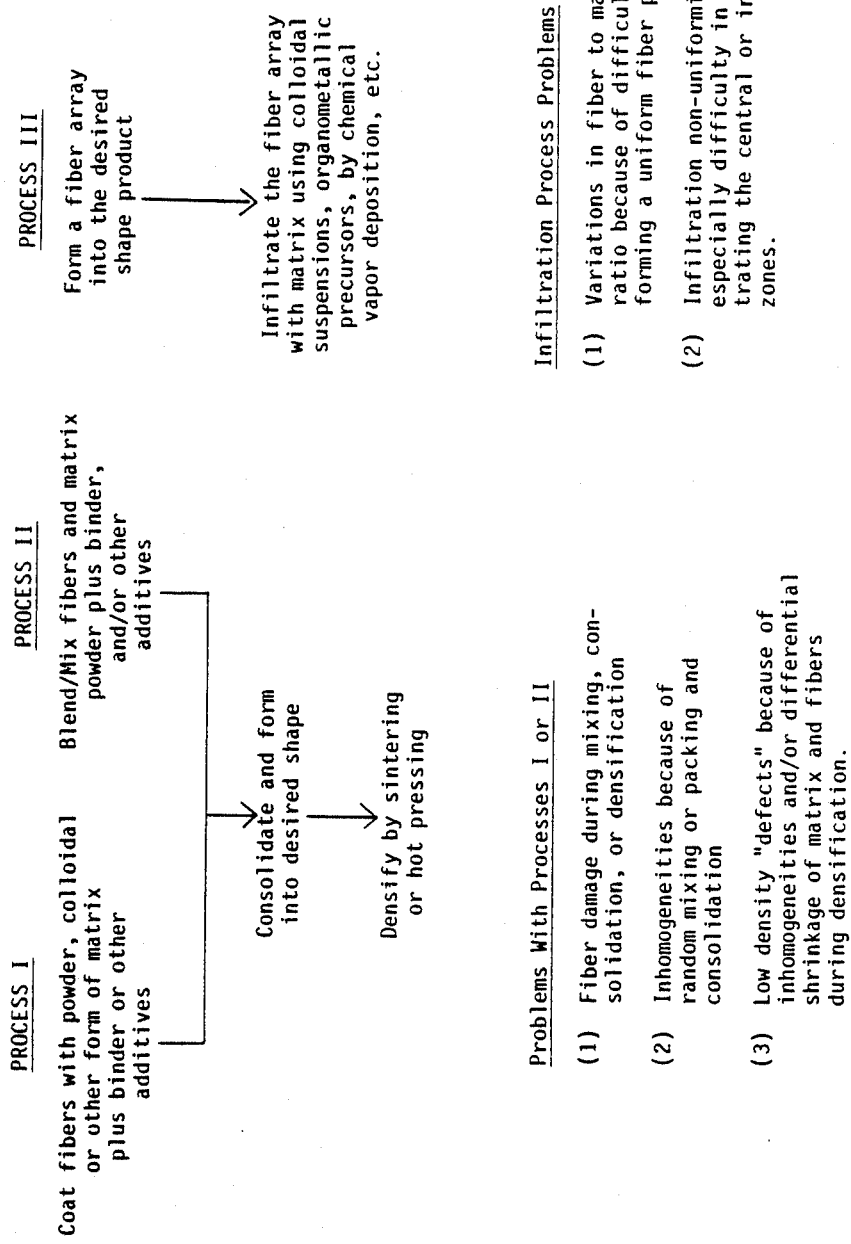
FIG. 1 illustrates three main prior art process methods.
Figure 2:
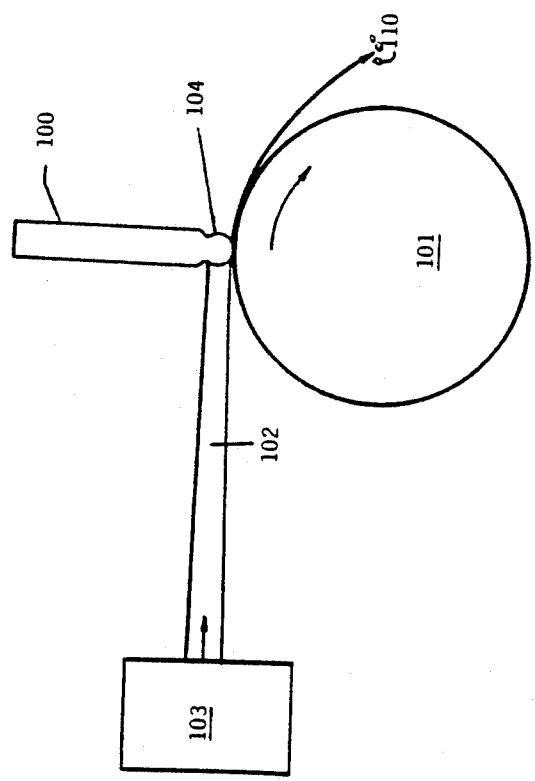
FIG. 2 is a schematic illustration of laser pendant drop melt extraction that can be used to produce particles useful in the invention.

The process that is effective in forming the desired type of microcomposite particle is melt extraction. A laser heat source pendant drop melt extraction technique has been utilized. FIG. 2 illustrates in schematic form the method of forming the rapidly quenched microcomposite particles by this process. A ceramic rod 100 that provides ceramic precursor feed material is provided. The rod 100 may also contain dispersed fibers as further discussed herein. The rod 100 is brought near a rotating extraction wheel 101. The end of the rod 100 near the wheel 101 is heated by a laser beam 102 produced by laser means 103. The laser beam 102 heats the rod 100 to form a molten pendant drop 104. As the drop 104 contacts the wheel 101 a portion of the melt is extracted to form rapidly quenched particles 110.

The use of a carbon dioxide laser (wavelength 10.6 μm) is particularly advantageous because of the high ($\geq 80\%$) absorption by many ceramics. The pendant drop 104 serves as a superheated melt from which the contacting rotating wheel 101 extracts melt that is ejected as droplets. These molten droplets cool by convection and radiation and their rate of cooling is size dependent. The formed droplet size is dependent upon melt composition, temperature, and extraction wheel design and speed of rotation.

EXAMPLE I

Figure 3:
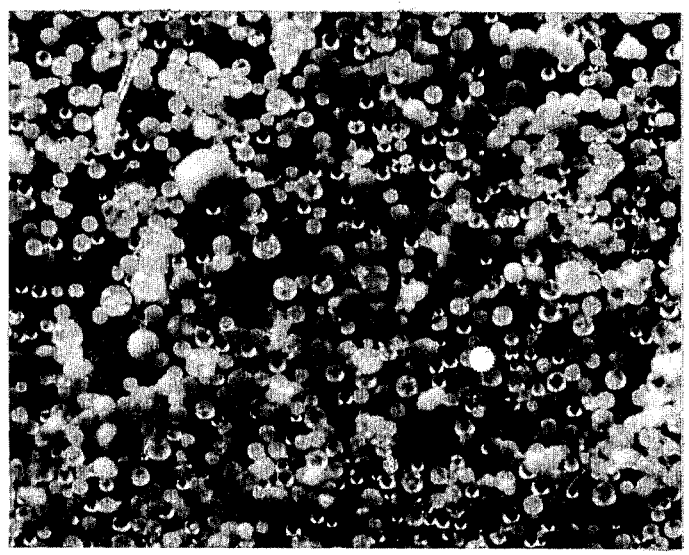
FIG. 3 is a photograph of ceramic particles produced by laser melt pendant drop melt extraction.

A rod 100 with a composition on a weight percent basis of 73.5 $Al_2O_3$, 19.2 $ZrO_2$, 2 $TiO_2$, 2.9 $SiO_2$ with the balance (2.4 weight percent) of $MnO_2$, $Fe_2O_3$, $Na_2O$, CaO and MgO was made. The rod 100 was melted and superheated to achieve high fluidity. A disc scopper extraction wheel 101 about 0.025 inches thick and 2 inches in diameter was oriented at 90 degrees to the axis of the ceramic rod 100 and rotated at about 5000 revolutions per minute. FIG. 3 shows rapidly quenched particles formed by the laser heat pendant drop melt extraction process.

Figure 4:
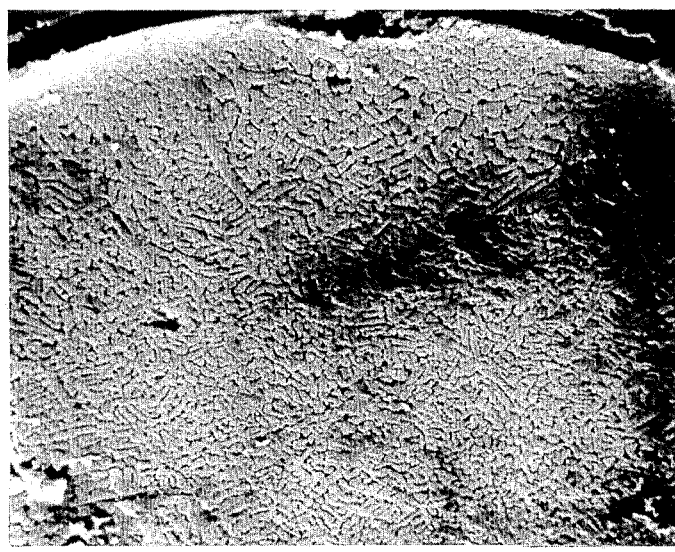
FIG. 4 is a scanning electron micrograph of a 90 μm diameter rapidly solidified ceramic particle formed by laser melt extraction.

FIG. 4 shows a fine fibrous microstructure achieved in rapidly quenched particles formed from this composition. It is seen that the small dimensions of this fibrous microstructure is in the range of about one micron or less and the long dimensions up to as much as about 10 μm. This fine structure will provide good strength and toughness.

Although this example used superheating to achieve sufficient fluidity for the material, heating to a level that assures melted material breakup into sufficiently fine droplets is all that is required.

EXAMPLE II

A second example employed the laser heating pendant drop melt extraction process to form microcomposite particles from an alumina-zirconia composition of about 80 weight percent alumina and about 20 weight percent zirconia.

Figure 5:
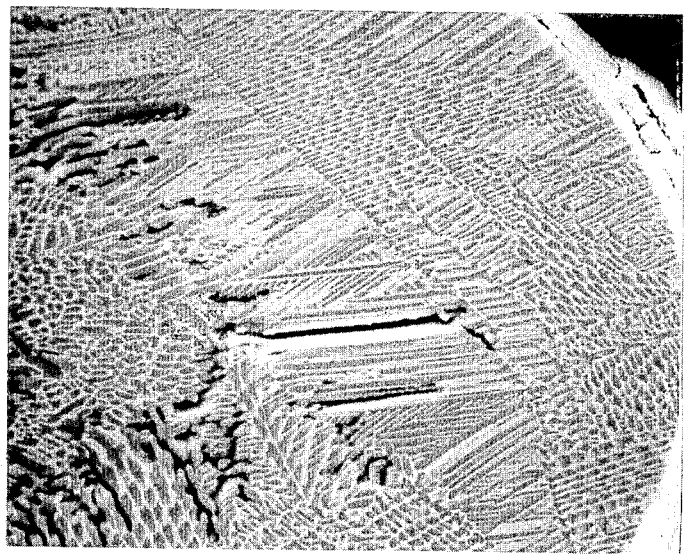
FIG. 5 is a scanning electron micrograph of 600 μm diameter rapidly solidified particle formed by laser melt extraction.
Figure 6:
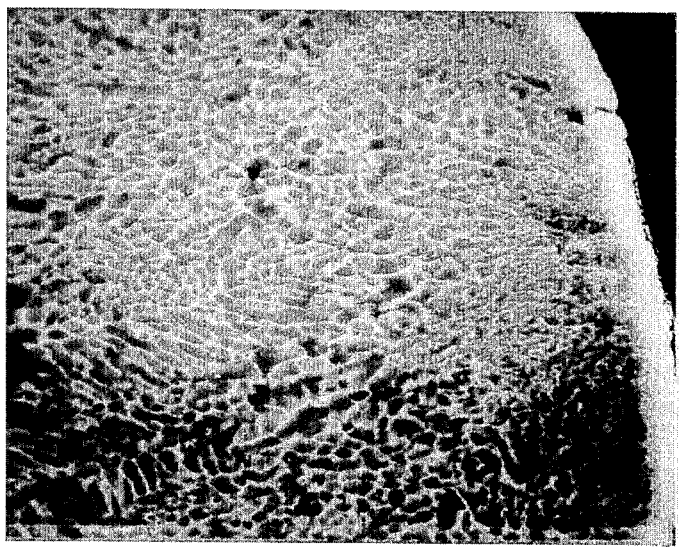
FIG. 6 is a scanning electron micrograph of a 225 μm diameter rapidly quenched material.

FIGS. 5 and 6 show the differing microstructures observed for two different sizes (diameters) of rapidly quenched microcomposite particles. FIG. 5 shows a partial section of an approximately 600 μm diameter particle with microstructural elements having large length to diameter ratios. The length to diameter ratios of fibers is commonly referred to as the aspect ratio. It should be noted that the apparent aspect ratio of the observed elongated elements in FIG. 5 is dependent upon the orientation of the elements to the sectioning plane through the particle. Thus, the apparently low aspect ratio elements may be oriented approximately perpendicular to the sectioning plane observed in the scanning electron microscope. In actuality these elements may be much longer and similar to the longer elements observed lying in the plane of the section. FIG. 6 shows a partial section through a smaller approximately 225 μm diameter particle. The higher quench rate of the smaller particle led to a microstructure having elongated phase elements of much smaller aspect ratio. Thus, the dendrite aspect ratio was found to be inversely proportional to quench rate, while fineness of the dendrites was found to be directly proportional to the quench rate. Quench rates giving the desired aspect ratio and fineness of dendritic structure can be readily determined.

As noted above, the apparent aspect ratios depend upon the orientation of each elongated element relative to the observed sectioning plane through the particle. The largest aspect ratios in FIG. 6 appear to be about five. In contrast, the particle in FIG. 5 shows elongated elements with aspect ratios up to about thirty. Thus it is seen that the aspect ratio of the elongated phases in the rapidly solidified particles may be varied widely according to the size of the extracted particles and related quench rate.

The edge geometry of the extraction wheel, the wheel material, the angle or orientation of the wheel to the pendant drop and the peripheral speed of the wheel all effect the extraction process. Wheels made of steel, copper, brass, or nickel coated copper can be utilized. The angle of the wheel edge can be varied from flat to an included angle of 30° and from continuous to serrated (toothed). Some extraction is achieved with all wheel geometries, but sharp small angle edges, either continuous or serrated are preferred. Peripheral wheel speeds over the range of 70 inches per second to 1,500 inches per second were tested. At less than about 200 inches per second the extraction product tended to be in the form of discontinuous fiber rather than spheres. At 1,500 inches per second extraction spheres were small and extraction was more intermittent. The preferred extraction conditions utilized to produce particles mostly in the 100 to 600 μm size range included continuous or serrated brass or copper wheels with sharp edges (included angles of less than 90°) and peripheral speeds of about 300 to 600 inches per second.

Particle quench rate was found to be primarily a function of particle diameter regardless of extraction wheel speed. If the mechanism of cooling is predominantly convective the rate is inversely proportional to the particle size according to derivations by Mehrabian, et al., Proceedings of the Sagamore Army Materials Research Conference on Recent Advanced In Materials Processing, Syracuse University Press (1978). Particles sizes that result in dendritic structures with an aspect ratio of 10:1 (length:diameter) are preferred. These can be prepared by the above and other known methods.

EXAMPLE III

In this example fracture toughness of the rapidly solidified particles is related with the dimensional fineness of their microstructures. The hardness indentation approach to measuring toughness could not be used since the particles were too small. Therefore, a comparative experimental technique was employed. A laser was used to melt and air quench the surface of small test bars to achieve dendritic microstructures similar to the particles. The dentritic surfaces were then ground and polished and subjected to hardness indentation. The relative fracture toughness may then be calculated employing the following relationships:

$$\text{Fracture toughness, } K_{IC} = \delta \left(\frac{E}{H}\right)^{\frac{1}{2}} PC^{-3/2}$$

where:
- δ = Experimentally determined constant, see Anstis, et al.
- E = Young's modulus
- H = Hardness
- P = Indentation load
- C = Radius of half-penny crack extending out from corner of indentation measured from center of indentation.

Figure 7A:
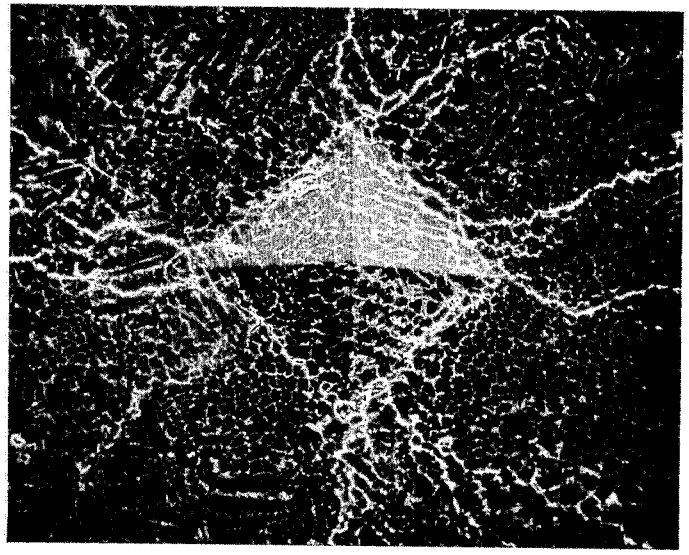
FIG. 7A and FIG. 7B illustrate the increase in fracture toughness associated with finer dendritic structure of the rapidly quenched material.
Figure 7B:
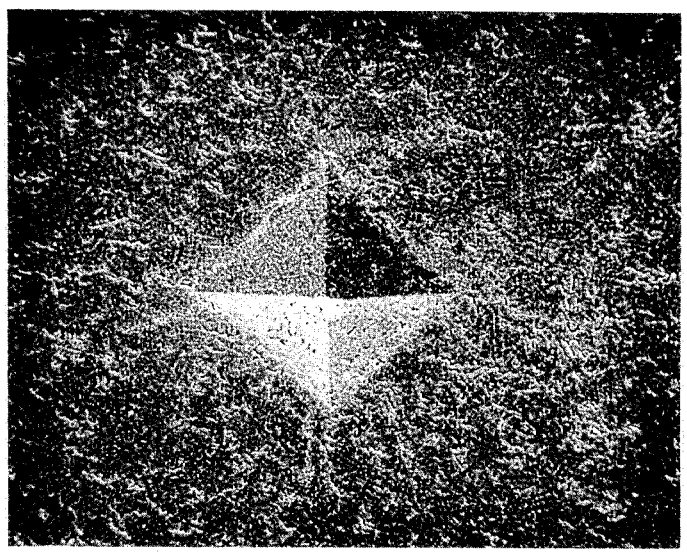

FIG. 7A and B illustrates two differing dendritic structures in terms of microstructural scale (dimensions) which were prepared and subjected to indentation hardness measurements as described above. FIG. 7A shows material having relatively coarse dendritic microstructure while FIG. 7B shows material having relatively finer dendritic microstructure. The computed toughness values are given on FIG. 7A and B and clearly show the greater toughness of the finer microstructure vs. the coarser structure (i.e. fracture toughness value of 8.0 vs. 5.5 MNm$^{-3/2}$).

These toughness values can be compared with state-of-the-art alumina-zirconia ceramics. The toughness values of alumina-zirconia ceramics will represent two groups: (1) those exhibiting significant toughening because of the presence of tetragonal phase zirconia and associated transformation toughening, and (2) those exhibiting lower toughness because the zirconia is present as a predominantly monoclinic phase or as a stabilized high temperature cubic phase in which case different toughening mechanisms dominate.

Both of the samples in FIG. 7A and B have been subjected to identical annealing heat treatments. Therefore both will contain similar amounts of any tetragonal phase zirconia and any observed differences in toughness are not attributable to tetragonal phase content. The anneal cycle for both consisted of a one hour hold at 1650° C. followed by cool down with the furnace. Table 1 below compares the toughness of these laser melt and quenched structures with non-dendritic alumina-zirconia materials.

TABLE 1
COMPARATIVE TOUGHNESS OF ALUMINA-ZIRCONIA

| Materials[1] | Toughness $K_{IC}$ in MNm$^{-3/2}$ |
|---|---|
| FIG. 7A Laser melt coarse dendritic structure | 5.5 |
| FIG. 7B Laser melt fine dendritic structure | 8.0 |
| Al$_2$O$_3$—ZrO$_2$ (cubic)[2] | 4.5 |
| Al$_2$O$_3$—ZrO$_2$ (tetragonal)[2] | 7.0 |

[1] All Materials ~80 wt % Al$_2$O$_3$, ~20 wt % ZrO$_2$
[2] Data from: F. F. Lange "Transformation Toughening, Fabrication Fracture Toughness and Strength of Al$_2$O$_3$—ZrO$_2$ Composites", J. Materials Science 17 (1982) pp. 247–254.

The data of Table 1 and FIG. 7A and B demonstrates two points. First, the finer dendrite structure exhibited toughness comparable to transformation toughened alumina-zirconia of similar composition. Second, toughness increased with higher quench rate and resulting finer dendrite microstructures. Even higher fracture toughness will result when using higher quench rates that result in finer dendritic structures.

EXAMPLE IV

This example illustrates the consolidation of rapidly solidified powders to produce tough ceramic components. The example shows that rapidly solidified particles may be merged under pressure and temperature and still retain the dendritic "fibrous" microstructures.

Figure 8:
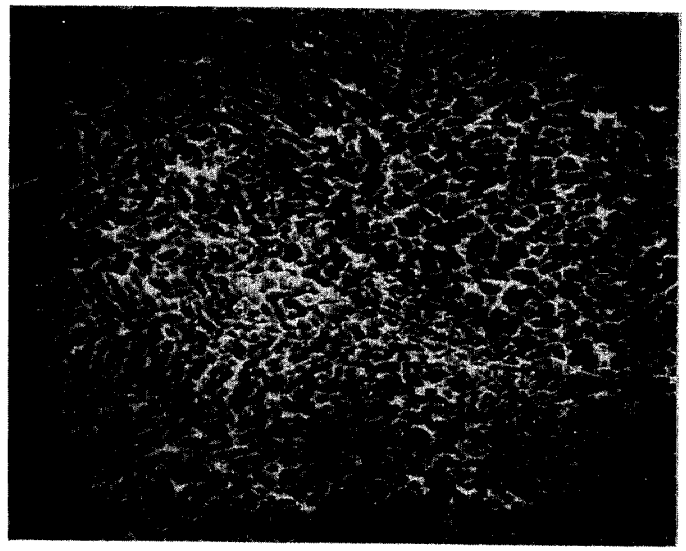
FIG. 8 is a scanning electron micrograph of the merged boundary between two particles.

Rapidly solidified particles were poured into a tantalum metal cylinder (lined with platinum foil to serve as a reaction barrier). The cylinder with contents was vacuum outgassed and then hermetically sealed (welded). The sealed tantalum container was hot isostatically pressed in helium at 28,000 psi and 1400° C. for 1 hour. The resulting consolidated compact formed from the starting rapidly solidified particles was sectioned, polished and examined by scanning electron microscopy. FIG. 8 shows a section through the merged boundary between two starting particles whose initial diameters were in the range of 350 μm. It may be seen that there is essentially a merging of the two particles (arrow). Even when viewed at a magnification of 1500× no discontinuity is evident. This merged region will behave much the same mechanically as the interior of the individual microcomposite particles.

The above temperature, pressure, and time did not result in complete compact densification; however, pressures at and above 28,000 psi, and temperatures at about 1500° C. for 2–4 hours would provide full densification.

The preceeding examples demonstrate the implementation of the invention. First, the laser melt extraction process demonstrates a process capable of forming rapidly solidified particles exhibiting a fibrous phase microstructure. Secondly, hot isostatic pressing demonstrated a process of consolidation capable of merging the individual microcomposite particles into a coherent bulk structure while retaining the desired "fibrous" particle microstructures.

The preceding examples have illustrated the capability of forming particles exhibiting the desired fibrous microstructures by laser melt extraction. This process was also demonstrated to be capable of forming rapidly solidified fibers. Such fibers exhibiting desired fibrous microstructural elements can be broken into particles and utilized for hot consolidation into tough ceramic components similar to the examples utilizing the rapidly solidified spherical particles. However, the spherical particles have the practical advantage of free flowing characteristics.

The feed rod 100 may be a ceramic having ceramic fibers incorporated therein. The fibers would need to be small enough to remain in the rapidly solidified particles 110 and in the pendant drops 104 as they are formed. These particles having both dendritic and fibrous structures can then be used to produce tough consolidated products having two layers of toughness, one being the dendrites and the other the incorporated fibers. The fibers must of course have a higher melting point than the matrix and be computable with the matrix.

The developed melt extraction process utilized laser heating. However, the pendant drop extraction process can utilize other heat sources such as focused radiation of broad range wavelengths or combinations of radiant and inductive heating, etc.

The rapidly solidified microcomposite particles can also be produced by gas atomization of a ceramic melt stream or by plasma melting or melting/atomization techniques. However, attainable uniformity of particle microstructures is expected to be poorer than for the melt extraction method.

Many other miscible ceramic systems (compositions) in addition to those cited in the examples can be processed by laser melt extraction to form rapidly solidified particles exhibiting desired fibrous microstructures. The systems: $Al_2O_3/SiO_2$, $Al_2O_3/HfO_2$, $Al_2O_3/MgO$, $Al_2O_3/Y_2O_3$ are examples of binary systems that are suitable; however, other binary, ternary, or multicomponent ceramic systems having one or more eutectics are also suitable.

Uniaxial hot pressing can also be utilized to consolidate the microcomposite particles. However, hot isostatic pressing is preferred because of its high pressure capability permitting consolidation at lower temperatures to better retain microcomposite microstructures. The preferred consolidation parameters will depend on the choice of the ceramic system. Ideally higher pressures are preferred so that lower processing temperatures below the eutectic may be utilized so that full consolidation will be obtained while retaining the dendritic microstructure of the particles. Pressures may range from 15,000 psi to 100,000 psi. Temperatures at or above those required to give particle consolidation but below the melting point or eutectic point of the matrix may be used. These temperatures will vary with each ceramic system but can easily be determined by those skilled in the art.

A second embodiment of the invention is also based upon rapid solidification processing, but mechanistically it differs from the first embodiment. This embodiment relies on the use of mixtures of ceramics which are immiscible in the molten state. By appropriate processing of such mixtures a dispersion of one or more immiscible phases in another phase (the matrix) would be rapidly sheared and solidified so as to produce elongation or fiberization of the dispersed immiscible phase(s) within the rapidly produced solidified particles to produce fibrous microstructures. The appropriate processing includes the production of particles as in the above described miscible system with the addition of rapid shear during the cooling step. This shear can be produced by flaking, spattering or pressing between rolls as the material emerges from the extraction wheel 101.

Examples of immiscible systems (compositions) which are applicable to this embodiment include: $SiO_2$-$TiO_2$, $SiO_2$-$Cr_2O_3$, $Al_2O_3$-$Ga_2O_3$, $SiO_2$-$MnO_2$, $NiO$-$B_2O_3$, $Dy_2O_3$-$B_2O_3$, $Er_2O_3$-$B_2O_3$, $Eu_2O_3$-$B_2O_3$, $Gd_2O_3$-$B_2O_3$, $Ho_2O_3$-$B_2O_3$, $Lu_2O_3$-$B_2O_3$, $Nd_2O_3$-$B_2O_3$, $Tm_2O_3$-$B_2O_3$, $Sm_2O_3$-$B_2O_3$, $Y_2O_3B_2O_3$, $Yb_2O_3$-$B_2O_3$, $Er_2O_3$-$GeO_2$, and $Y_2O_3$-$GeO_2$.

In order to optimize toughness relatively high aspect ratios will be desired. The minimal useful aspect ratio is about three, the preferred values are above ten, and the maximum depends upon the particle (microcomposite) size and the method of their production.

A third embodiment of the invention uses one of several methods for forming particles having discontinuous fibers or whiskers randomly dispersed within a low density matrix. Such particles may be formed by selecting and blending a matrix powder, an organic binder and fibers; and granulating the mix into spherical agglomerates. Subsequent thermal processing removes the binder and other organics to yield a lightly sintered matrix containing the dispersed fibers, further thermal processing is preferred to the point where the agglomerated particles are densified. The particles can be densified by solid state or liquid phase sintering at conditions known to produce dense particles without agglomeration to other particles. The densification is carried out to the degree so as to form an intermediate product where the matrix surrounding the fibers in the particle is sufficiently dense so that it eliminates or reduces fiber damage during the subsequent consolidation step. This intermediate product will exhibit enhanced toughness over the nonreinforced particle. Another method is to form a liquid suspension or slurry of matrix powder and fibers plus dispersants, etc. then atomize and spray or freeze dry-followed by thermal processing to densify the matrix. In a third method, fibers or whiskers are dispersed in a sol (matrix precursor), the sol is atomized and gelled to form spherical particles containing dispersed fibers or whiskers. The spherical particles are then thermally processed to convert the gel matrix into the desired composition and to densify the matrix. The microcomposite particles from any of the above methods are used as the feed material for hot forming a desired ceramic component using uniaxial or isostatic hot pressing.

The major advantage of the third embodiment over prior art methods is that process techniques may be used to disperse fibers in the matrix and "fix" the dispersion in the small microcomposite particles. When these microcomposites are then consolidated into the desired component, macrostructural uniformity is assured down to the domain size of the microcomposite. Furthermore, the techniques usable for dispersing fibers in small microcomposites can minimize fiber damage.

A general description of the process for all of the embodiments includes the steps of providing a ceramic precursor material; forming microcomposite particles from the ceramic precursor material in a manner adapted to produce fibrous microstructures that impart enhanced toughness to the particles; and consolidating the microcomposite particles at a pressure, a temperature and for a time adapted to form bulk ceramic components that exhibit the general microstructure and toughness of the microcomposite particles, wherein the temperature is maintained above that where particle consolidation occurs but below the eutectic temperature or melting temperature of the matrix. The size of the microparticles may be in the range of 10 μm to 1000 μm.

The first embodiment involves providing miscible ceramics capable of producing dendritic microstructures on quenching as the ceramic precursor material; heating and melting the ceramic precursor material; forming droplets from the melted ceramic; and rapidly quenching the droplets in a manner adapted to produce particles having dendritic microstructures therein that impart enhanced toughness to the particle.

The second embodiment includes providing a ceramic from an immiscible ceramic system selected from the group consisting of $SiO_2$-$TiO_2$, $SiO_2$-$Cr_2O_3$, $Al_2O_3$-$Ga_2O_3$, $SiO_2$-$MnO_2$, $NiO$-$B_2O_3$, $Dy_2O_3$-$B_2O_3$, $Er_2O_3$-$B_2O_3$, $Eu_2O_3$-$B_2O_3$, $Gd_2O_3$-$B_2O_3$, $Ho_2O_3$-$B_2O_3$, $Lu_2O_3$-$B_2O_3$, $Nd_2O_3$-$B_2O_3$, $Tm_2O_3$-$B_2O_3$, $Sm_2O_3$-$B_2O_3$, $Y_2O_3$-$B_2O_3$, $Yb_2O_3$-$B_2O_3$, $Er_2O_3$-$GeO_2$, and $Y_2O_3$-$GeO_2$. Further processing steps include heating and melting the ceramic precursor material; forming droplets from the melted ceramic; and rapidly quenching and shearing the droplets in a manner adapted to produce particles having fibrous microstructures that impart enhanced toughness to the particle. The microcomposite particles are then consolidated to produce a tough ceramic composite.

The third embodiment has three approaches. In the first approach the steps include selecting and blending a matrix powder, an organic binder, and fibers to form a mixture; granulating the mixture into spherical agglomerates; and thermally processing to remove binder, organics, and to densify the particles; and finally consolidating the particles. The second approach involves the steps of blending matrix powder, fibers, dispersants and liquid to form a slurry; atomizing the slurry and drying to form spherical particles; thermally processing the particles to densify the particles; and consolidating the particles. The third approach includes the steps of dispersing fibers in a sol; atomizing and gelling the sol containing dispersed fibers to form spherical gel particles; thermally processing the spherical gel particles to densify the particles; and consolidating the particles.

The present invention results in other advantages not available in the prior art. First, since fibrous microstructures are incorporated within each microparticle the overall inhomogeneities will be less than those obtained by random mixing of fibers and particles. Secondly, although each microcomposite may have some fibrous structure distribution within it that is not random, the random distribution of the microparticles will assure that the maximum order will be on the level of a microparticle. In contrast much larger volumes of orientation are likely with random mixing of fibers and particles.

A toughened ceramic composite article can be produced by the various embodiments of the above described process. The article will have a bulk structure containing individual microcomposite zones. Each zone is defined by the material derived from an individual previously unconsolidated microparticle. The microcomposite zones are thus filled with a ceramic matrix material that has fibrous microstructures dispersed within it. The ceramic matrix and fibrous structures define a ceramic material. Each portion of consolidated ceramic material (ceramic microparticle) within its microzone has a random orientation with respect to the orientation of material in other microzones.

The boundaries between the microzones defined by the material from the consolidated particles may be visible to the eye as in FIG. 8; however, this need not be the case as visibility is dependent on the morphology and orientation of fibrous structures within adjacent particles. Melting of the particles is avoided and material from each microparticle will remain discrete thus defining a microzone. The size of the microzones may be about 10 μm to about 1000 μm or generally the size of the starting microparticles although the shape of the microzones may be distorted from the shape of the original microparticles due to the consolidation step.

The ceramic material within the microzones will contain fibrous structures that are dendrites, ceramic fibers or whiskers, or a mixture of dendrites and ceramic whiskers. The ceramic material may be composed of a matrix discussed earlier that uses miscible or immiscible ceramics. The miscible ceramics will be a mixture of two or more miscible ceramics having one or more eutetics.

It may be desirable to produce particles of different shapes (flakes, spheres, rods), sizes, and compositions. Blends of mixtures of the above can produce final consolidated products of optimum toughness determined by particle shape, particle size, and composition. For example, selection of fibers and spherical particles in the proper ratios will produce anisotropic final product characteristics.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A process for producing a toughened ceramic composite comprising:
   a. providing a ceramic precursor material;
   b. forming microcomposite particles from the ceramic precursor material in a manner adapted to produce fibrous microstructures that impart enhanced toughness to the particles; and
   c. consolidating the microcomposite particles at a pressure, a temperature and for a time adapted to form bulk ceramic components that exhibit the general microstructure and toughness of the microcomposite particles, wherein the temperature is maintained above that where particle consolidation occurs but below the eutectic or melting temperature of the matrix.

2. The process of claim 1, further comprising forming the microcomposite particles by a laser melt extraction process.

3. The process of claim 1 further comprising consolidating the microcomposite particles by hot isostatic compaction.

4. The process of claim 1, whereby steps of a and b further comprise:
   a. providing miscible ceramics capable of producing dendritic microstructures on quenching as the ceramic precursor material;

b(1) heating and melting the ceramic precursor material;

(2) forming droplets from the melted ceramic; and (3) rapidly quenching the droplets in a manner adapted to produce particles having dendritic microstructures therein that impart enhanced toughness to the particle.

5. The process of claim 1 further comprising:

a. providing a ceramic from an immiscible ceramic system selected from the group consisting of $SiO_2$-$TiO_2$, $SiO_2$-$Cr_2O_3$, $Al_2O_3$-$Ga_2O_3$, $SiO_2$-$MnO_2$, $NiO$-$B_2O_3$, $Dy_2O_3$-$B_2O_3$, $Er_2O_3$-$B_2O_3$, $Eu_2O_3$-$B_2O_3$, $Gd_2O_3$-$B_2O_3$, $Ho_2O_3$-$B_2O_3$, $Lu_2O_3$-$B_2O_3$, $Nd_2O_3$-$B_2O_3$, $Tm_2O_3$-$B_2O_3$, $Sm_2O_3$-$B_2O_3$, $Y_2O_3$-$B_2O_3$, $Yb_2O_3$-$B_2O_3$, $Er_2O_3$-$GeO_2$, and $Y_2O_3$-$GeO_2$;

b(1) heating and melting the ceramic precursor material;

(2) forming droplets from the melted ceramic; and (3) rapidly quenching and shearing the droplets in a manner adapted to produce particles having fibrous microstructures that impart enhanced toughness to the particle.

6. The method of claim 1 whereby the step of forming microcomposite particles further comprises:

a. selecting and blending a matrix powder, an organic binder, and fibers to form a mixture;

b. granulating the mixture into spherical agglomerates; and c. thermally processing to remove binder and other organics and to densify the particles.

7. The method of claim 1 whereby the step of forming microcomposite particles comprises:

a. blending matrix powder, fibers, dispersants and liquid to form a slurry;

b. atomizing the slurry and drying to form spherical particles; and c. thermally processing the particles to densify the particles.

8. The method of claim 1 whereby the step of forming microcomposite particles further comprises:

a. dispersing fibers in a sol;

b. atomizing and gelling the sol containing dispersed fibers to form spherical gel particles; and c. thermally processing the spherical gel particles to densify the particles.

9. The process of claim 3, whereby the step c of consolidating the microcomposite particles further comprises:

c(1) placing the particles into a hot isostatic pressing container;

(2) vacuum sealing the container; and (3) hot isostatically pressing in an inert gas atmosphere at a temperature, pressure and for a time adapted to produce a consolidated compact having merged particles whose general microstructure has been preserved.

10. The process of claim 1, further comprising:

a. forming a plurality of particle shapes, sizes, and compositions in step b; and b. selecting from the plurality of particle shapes, sizes and compositions formed in step b particles having desired shape, size, and compositional characteristics to acheive enhanced toughness of the composite formed in the subsequent consolidation step.

11. A toughened ceramic composite article comprising:

a. a bulk structure containing individual microcomposite zones;

b. a matrix material within each microcomposite zone that contains dispersed fibrous microstructures, wherein the matrix material together with the dispersed fibrous microstructures is a ceramic material;

c. the ceramic material that is contained in each microcomposite zone has a random orientation with respect to ceramic material in other microcomposite zones; and d. the boundaries of the microcomposite zones are defined by the consolidated material boundaries of previously unconsolidated ceramic microcomposite particles.

12. The composite article of claim 11, wherein the fibrous microstructures are dendrites.

13. The composite article of claim 11, wherein the fibrous microstructures are ceramic fibers.

14. The composite article of claim 11, wherein the fibrous microstructures are dendrites and ceramic fibers.

15. The composite article of claim 11, wherein the matrix material within each microcomposite zone is a mixture of multicomponent miscible ceramics having one or more eutectics.

16. The composite article of claim 11, wherein the ceramic material within each microcomposite zone is composed of immiscible ceramics selected from the group consisting of $SiO_2$-$TiO_2$, $SiO_2$-$Cr_2O_3$, $Al_2O_3$-$Ga_2O_3$, $SiO_2$-$MnO_2$, $NiO$-$B_2O_3$, $Dy_2O_3$-$B_2O_3$, $Er_2O_3$-$B_2O_3$, $Eu_2O_3$-$B_2O_3$, $Gd_2O_3$-$B_2O_3$, $Ho_2O_3$-$B_2O_3$, $Lu_2O_3$-$B_2O_3$, $Nd_2O_3$-$B_2O_3$, $Tm_2O_3$-$B_2O_3$, $Sm_2O_3$-$B_2O_3$, $Y_2O_3$-$B_2O_3$, $Yb_2O_3$-$B_2O_3$, $Er_2O_3$-$GeO_2$, and $Y_2O_3$-$GeO_2$.

* * * * *